April 27, 1926.

G. STRANDT

BOTTLE HANDLING MACHINE

Filed Nov. 12, 1920  6 Sheets-Sheet 3

1,582,315

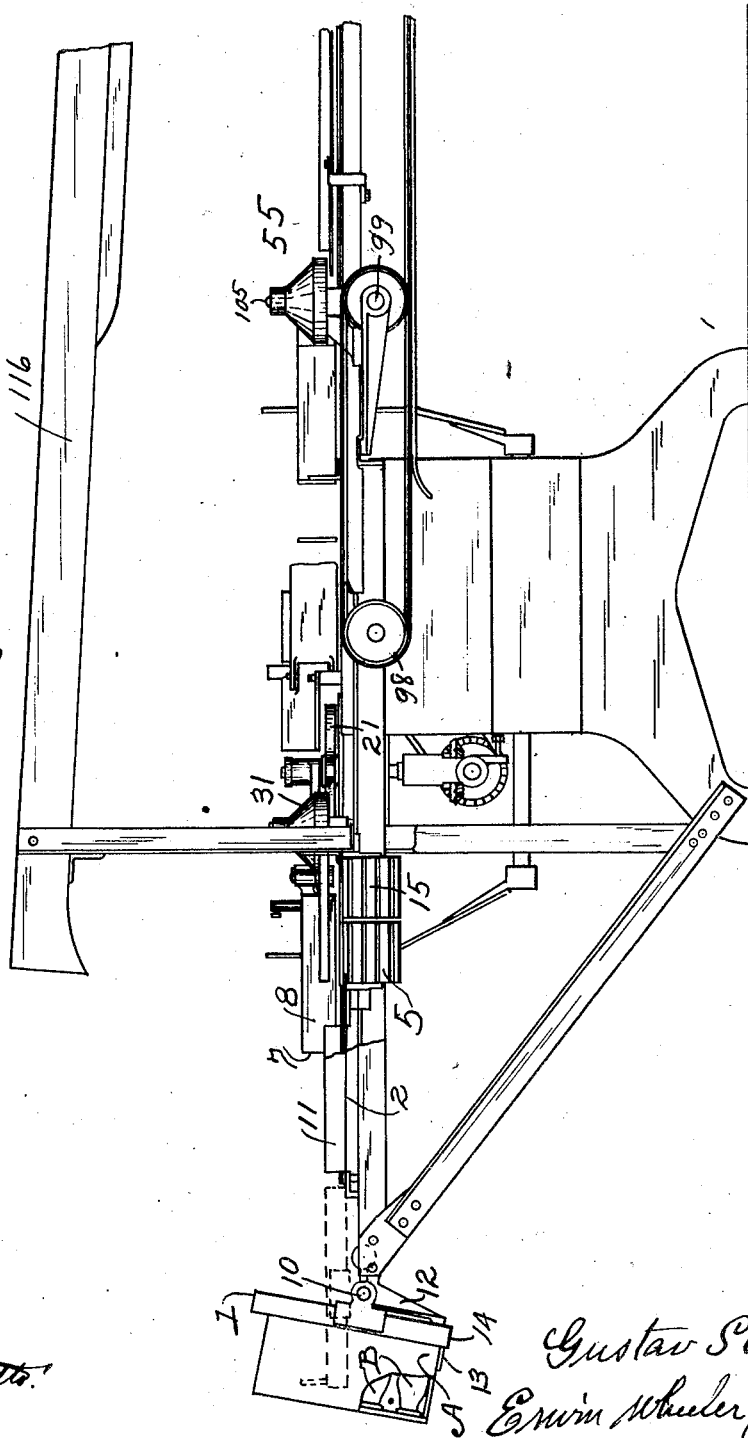

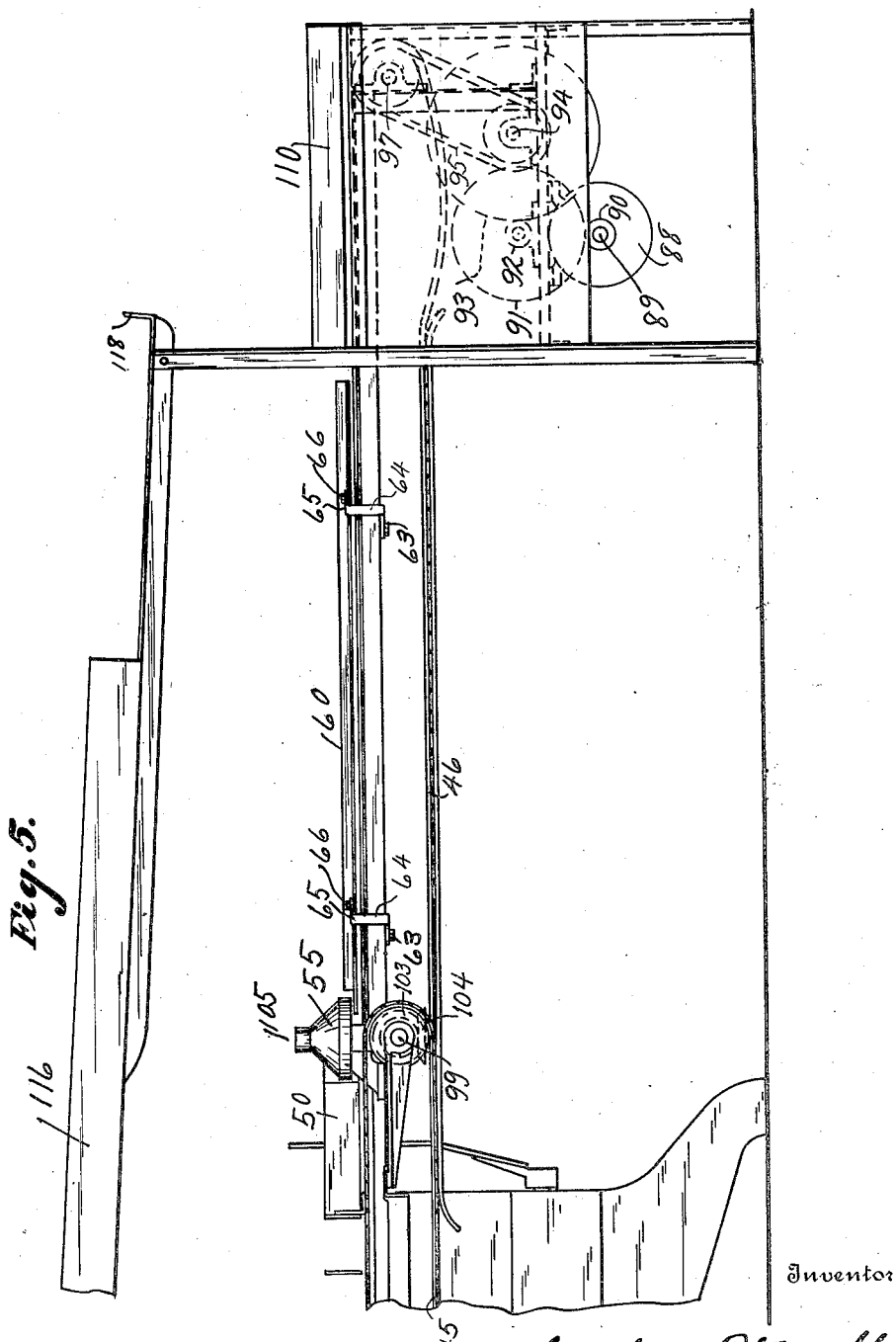

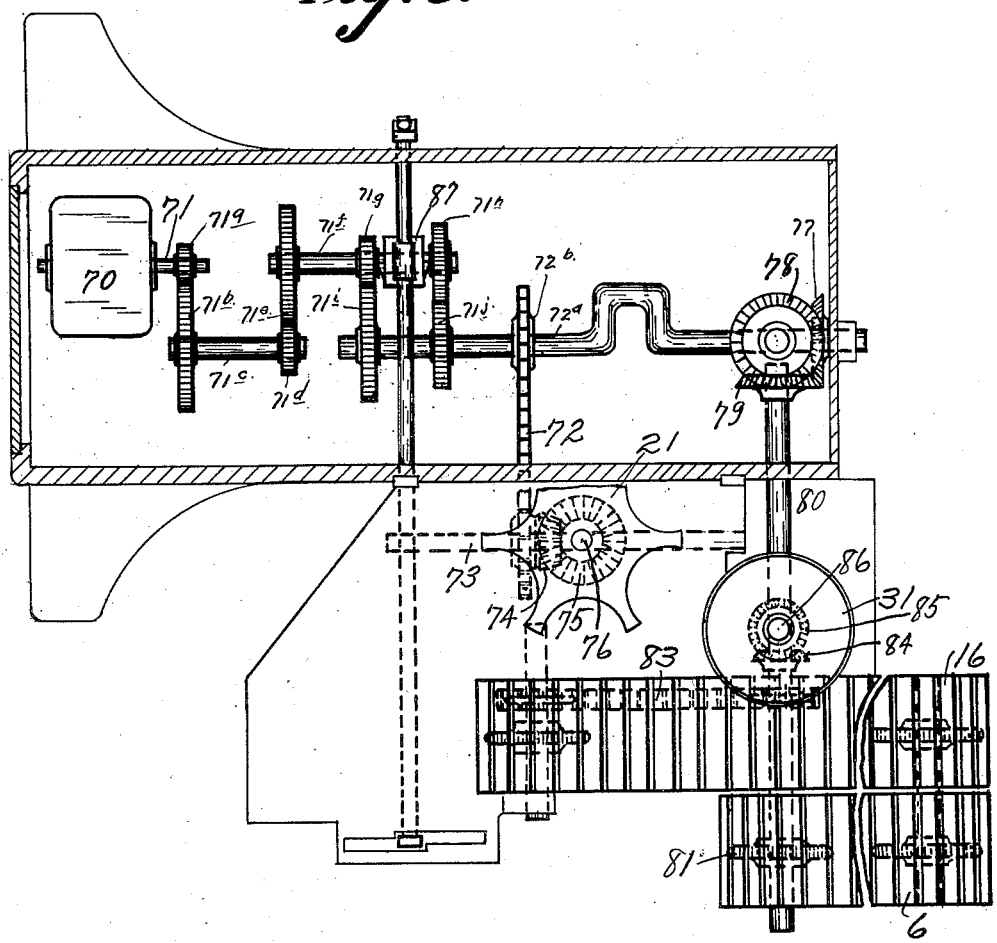

Patented Apr. 27, 1926.

1,582,315

UNITED STATES PATENT OFFICE.

GUSTAV STRANDT, OF MILWAUKEE, WISCONSIN, ASSIGNOR TO MILWAUKEE DAIRY SUPPLY MANUFACTURING CO., OF MILWAUKEE, WISCONSIN, A CORPORATION OF WISCONSIN.

BOTTLE-HANDLING MACHINE.

Application filed November 12, 1920. Serial No. 423,685.

*To all whom it may concern:*

Be it known that I, GUSTAV STRANDT, a citizen of the United States, residing at Milwaukee, county of Milwaukee, and State of Wisconsin, have invented new and useful Improvements in Bottle-Handling Machines, of which the following is a specification.

This is a companion application for Letters Patent for bottle handling machines, a former application having been filed July 15, 1920, Serial #396,420, which is directed more particularly to the mechanism for delivering bottles to bottle filling machines in single file and in special relation to each other.

This application relates more particularly to the provision of means for delivering bottles in bulk to one or more feeders, the invention herein disclosed and claimed having as objects, means to facilitate a delivery of crated and inverted bottles to a suitable infeeding table in an upright position and subsequently automatically conveying and distributing them to infeeding conveyors of the type disclosed in said former application in such a manner that one or more filling or filling and capping machines may be kept constantly supplied.

A further object is to provide means, co-operative with a suitable conveyor, for delivering bottles from groups or clusters in one or more single files, and in one or more directions to feeders of the type disclosed in said former application, also to provide means for receiving and delivering filled bottles coming from one or more filling machines, in a single file to a delivery table or crating stand, and to provide means whereby the crates removed from empty bottles at the infeeding side or end of the apparatus, may be conveniently transferred directly across the working portions of the apparatus and again used to receive the filled bottles. Also to provide means for steadying the filled bottles while automatically rotating them for inspection purposes and moving them to a point of final delivery such as a table or crating stand; also to provide apparatus for handling bottles and passing them into and out of a filling or capping machine efficiently with minimum labor, substantially no breakage, and with maximum certainty and care, regard being also had for economy of space and simplicity of structure.

An embodiment of my invention is shown in the accompanying drawings in which:—

Figures 4 and 5 are side elevations of the parts shown in Figures 2 and 3 respectively, with the crate conveying cross chute in position.

Figure 6 is a plan view of the driving connections for one of the infeeding sections of the machine.

Figure 7 is a detail side view of the gate and the means for operating it under resilient pressure.

Figure 8 is a detail view of the guard arm 24 as seen from the outer side showing the means for adjusting it.

Like parts are identified by the same reference characters thruout the several views.

Figure 1:
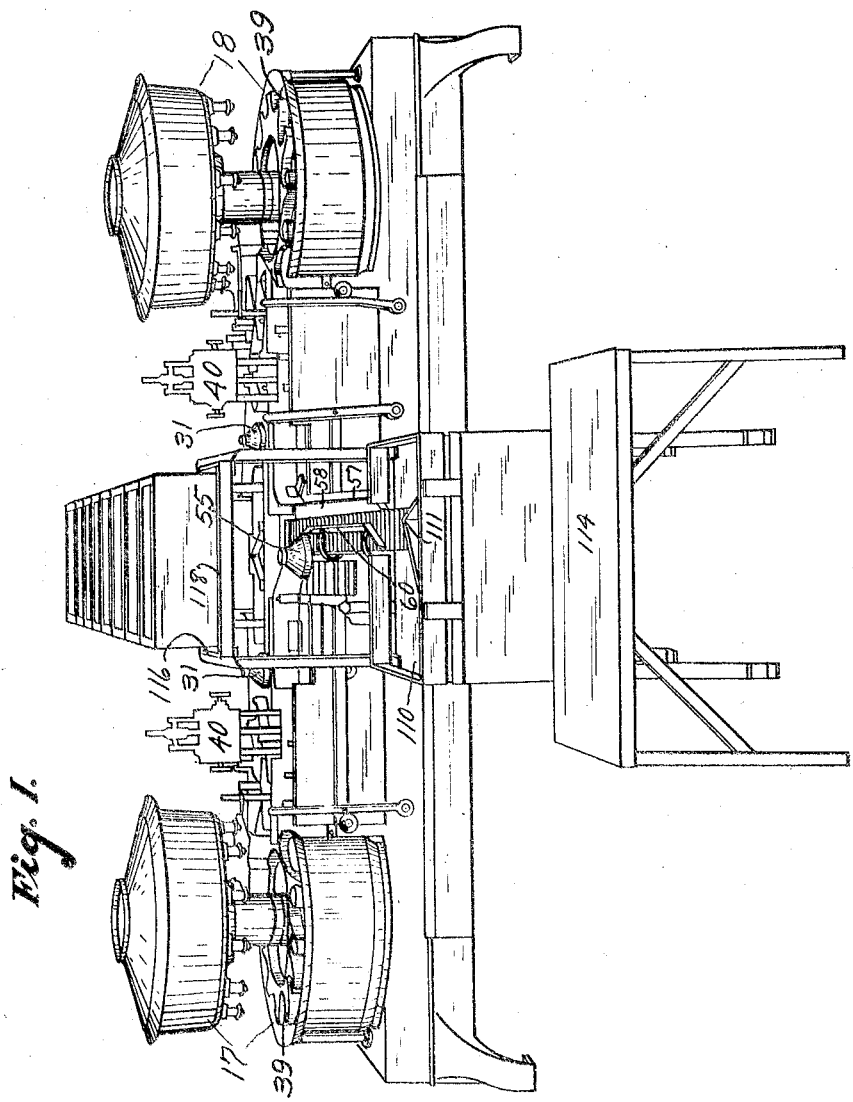
Figure 1 is a perspective view of my improved bottle handling apparatus associated with bottle filling and capping machines, the view being taken from the rear or delivery side.

In general organization, the receiving portion of the apparatus comprises a tilting receiving table 1, a cooperating stationary table 2, a set of alined transversely disposed conveyors 5 and 6 extending laterally in opposite directions from the central portion of the rear margin of table 2, the proximal ends of these conveyors being covered by a triangular deflector having an apex at 7, between the conveyors, and walls 8 and 9 diverging rearwardly and equally on each side of the apex across the upper surfaces of the conveyors.

The tilting table 1 is pivoted to the frame at 10 in the rear of its center of gravity and it therefore tilts, normally, to the inclined position in which it is shown in Figure 4. Its downwardly tilting movement is arrested by the stop bracket or brackets 12. The front and side margins of this table have raised guards 13 and 14. This allows the operator to place the upper rear margin A of the crate against the downwardly tilted front margin of the table 1 and he may then swing the crate upwardly and rearwardly until its top, and the bottom of the inverted bottles B therein, are brought against the surface of the table. Thereupon a continued tilting pressure upon the crate tending to move its upper side rearwardly, will cause the table 1 to swing to a horizontal position with the bottles right side up. The crate may then be pushed bodily to the rear, until it and its contained bottles rest on table 2 with the bottles right side up.

When any given crate is pushed upon table 2 bottles previously placed thereon will of course be pushed rearwardly and delivered to one or both conveyors 5 and 6. The crate thus pushed upon table 2 may then be lifted from the bottles which it contained, and the next crate similarly handled will push these bottles rearwardly to the conveyors. The bottles will be separated by the apex 7 of the deflector and a substantially equal number will pass to the respective sides and be received on the conveyor chains or aprons 5 and 6. These conveyor chains or aprons have their upper surfaces substantially at the level of the table 2, and of table 1 when horizontally disposed, and, as they run in opposite directions, the bottles will of course be conveyed laterally in opposite directions from the respective sides of the deflector. Side guards 11 on table 2 prevent the bottles from leaving the table 2 except at its rear margin.

Similar conveyors 15 and 16 are disposed parallel to the conveyors 5 and 6, and immediately at the rear thereof. Each of these conveyors is actuated in the same direction and at the same level as the conveyor 5 (or 6) with which it is associated but it extends farther in a lateral direction and constitutes an infeeding conveyor for the delivery of bottles to a filling machine 17 (or 18) thru a gateway controlled by a resiliently yielding arm 20 and a rotary star wheel 21 similar to those described and claimed in said former application. The filling machine may be assumed to be similar to that disclosed in Letters Patent of the United States numbered 1,174,453 and dated March 7, 1916, for a combined milk bottling and capping machine.

Guide rails or guards 24 and 25 are secured to the respective side guards 11 on the table 2, and project obliquely across the outer portions of the conveyors 5 and 6 and partially over the conveyors 15 and 16, the outer ends of the guards are supported by brackets 27. These obliquely disposed guards 24 and 25 serve as guides to push the bottles from the conveyors 5 and 6 toward the rear side of the conveyors 15 and 16, whereby the bottles are caused to travel along a path leading to the gate way guarded in each instance by the swinging arm 20 and star wheel 21. The brackets 27 are provided with a plurality of holes 27', through one of which the connecting bolt or screw may selectively pass in accordance with the adjustment of the guard. The guard portions which fit the side guards 11 are simularly provided with a plurality of holes as indicated in Figure 8, whereby the connecting bolt or screw may pass through the appropriate hole into engagement with the guard 11 when the guard 24 (or 25) is properly adjusted.

Figure 2:
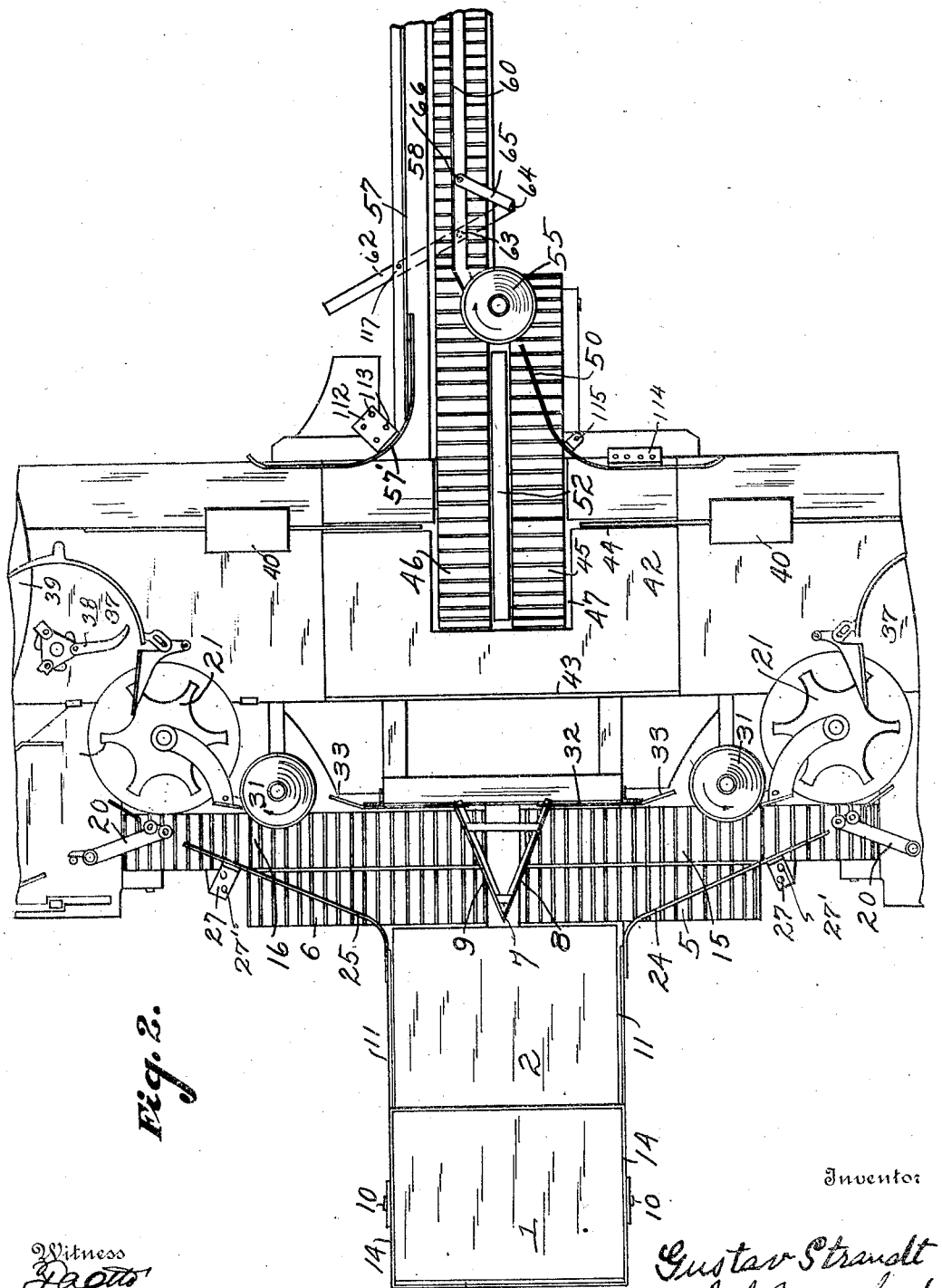
Figure 2 is an enlarged plan view of the front and middle portions of the bottle handling apparatus embodying the conveying herein described and with the crate conveying cross chute removed.
Figure 3:
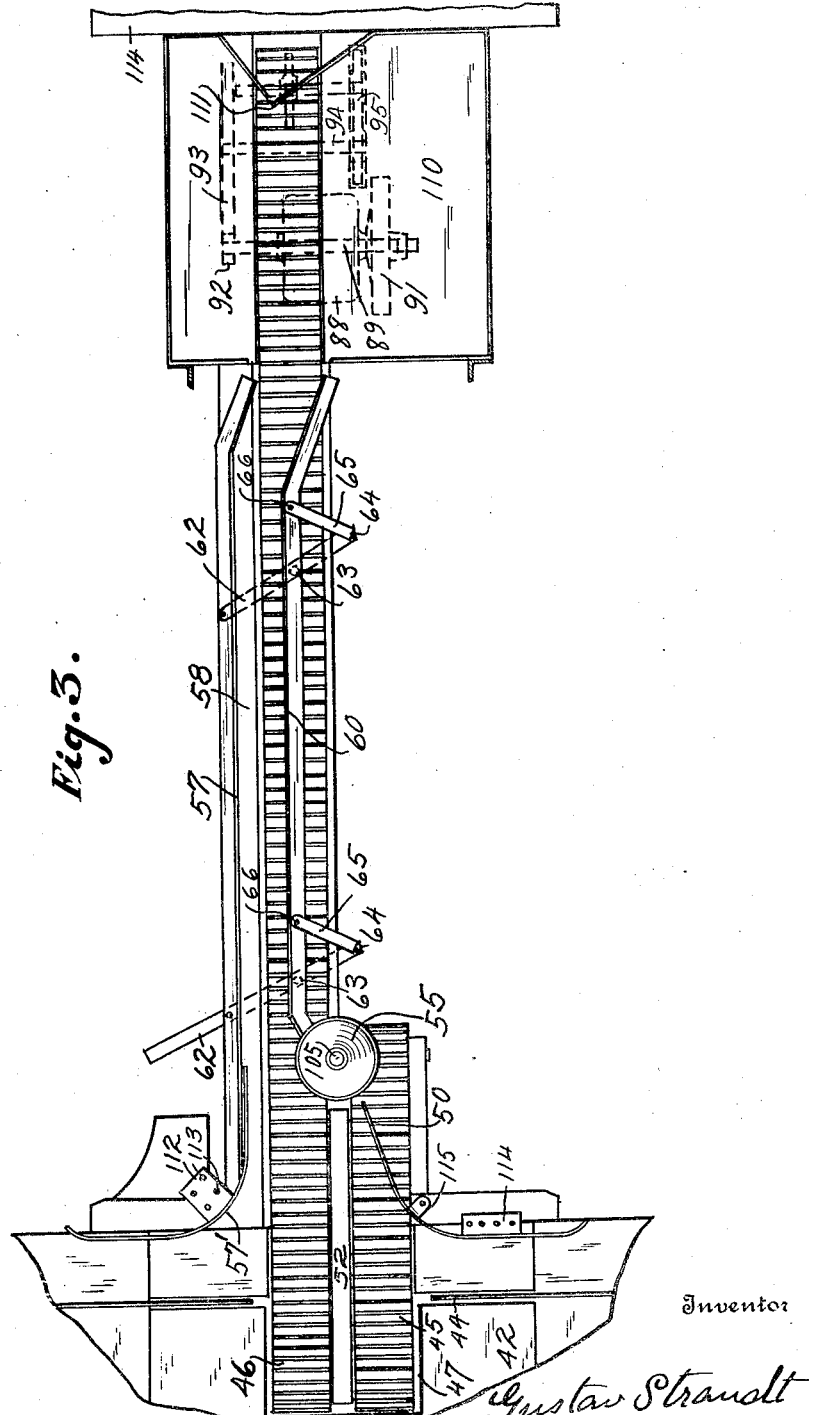
Figure 3 is a plan view of the collecting and delivery portions of said bottle handling machine, the same being that portion which receives and handles the filled and capped bottles.

The bottles travel singly or in pairs and clusters along the respective sets of conveyors 5 and 15, 6 and 16, but they are progressively crowded to the rear by the guard rail 24 (or 25) and before reaching the gate way they are required to pass between the guard rail and a rotating feeding member or wheel 31, one margin of which projects over the rear portion of the conveyor 15 (or 16). Before reaching the feeding wheel or member 31 the bottles are held to the rear conveyors by walls 32 having obliquely inclined portions 33 adjacent to the feeding wheels 31. The space between each feeding wheel 31 and the opposing guard rail is of sufficient dimensions to allow a single bottle to pass freely through it while preventing the passage of more than one bottle at a time. Each feeding wheel is revolved in the direction indicated by the arrows in Figure 2 and any bottle that is brought in contact with the feeding wheel is therefore not only actuated by the wheel in the same direction that the conveyor tends to carry it but it is also rotated on its own axis. Any other bottle tending to become wedged between the engaged bottle and the opposing guard rail will be displaced backwardly by the rotating bottle, thereby allowing the rotating bottle to pass to the gate way above described, and which is guarded by the swinging arm 20 and star wheel 21. The bottle is thus delivered to one of the spaces between the star wheel arms and carried by the star wheel thru the gate way as more fully described in said former application. Thereupon the bottles are delivered across a feeding table 37 by a spacing feeder 38 and deposited upon the turntable 39 of a filling machine similar to that described in said former Patent 1,174,453. This machine delivers the bottles to a capper 40 also shown and described in said former patent and from which the filled and capped bottles pass to a table 42 over which each bottle is pushed by the succeeding bottles between the front and rear walls 43 and 44 until they are received upon outfeeding conveyors 45 and 46 the upper surfaces of which at their front ends are substantially on a level with the top of the table and received in a notch 47 therein.

The conveyors 45 and 46 carry the bottles rearwardly and an obliquely disposed guard rail 50 tends to crowd them from the conveyor 45 to the conveyor 46. A stationary bar 52 fills the space between the conveyors and constitutes in effect an extension of the table which facilitates the transfer of bottles from the conveyor 45 to the conveyor 46.

It will be understood that inasmuch as there are two filling and capping machines associated with the apparatus, above described and located at the respective sides of the apparatus, the filled bottles will be delivered to the table 42 at both ends thereof and will be pushed toward the center of the table, i. e., toward the longitudinal center line of the bottle handling machine herein described or toward the line along which the bar 52 is disposed. Therefore the bottles will be delivered to the conveyors 45 and 46 singly or in pairs or clusters as they are crowded upon the conveyors by the pressure of other bottles delivered to the table from the capping machines, but as the bottles pass rearwardly upon the conveyors 45 and 46 in the irregular manner above described they are eventually brought in contact with the rotary feeding member or wheel 55, the function of which is similar to that of the infeeding wheels 31 above described. The outfeeding wheel 55 however, is preferably revolved at a higher rate of speed, i. e., at substantially twice the speed of the infeeding wheels 31, there being twice the number of bottles to be handled. This outfeeding wheel 55 cooperates with a guard rail or wall 57 parallel with the side margin of the conveyor 46 but spaced therefrom to allow a stationary bar or floor 58 to be interposed between the wall 57 and the conveyor with its upper surface substantially on a level with the upper surface of the conveyor and adapted to receive approximately half of the bottom of the bottle after the latter passes the outfeeding wheel 55. An adjustable guard rail 60 extends from the vicinity of the outfeeding wheel 55 over the surface of the conveyor 46 longitudinally thereof to hold the bottles in line as they travel rearwardly between this guard rail and the wall 57. The guard rail 60 may be adjusted in planes parallel to the wall 57 by levers 62 pivotally connected with the frame at 63 and having upwardly curving portions at 64 which carry operating arms 65 pivoted at 66 to the guard 60. Two of these levers are employed in order that the guard 60 may be held in parallel relation to the wall 57 in its various positions of adjustment. The guard rails 24 and 25 at the infeeding end of the machine are also preferably adjustable by means of the brackets 27 to move their rear ends toward or from the infeeding wheels 31. The adjustment of the guard rails 24 and 25 is secured through the bracket 27 by means similar to that hereinbefore described with reference to lever 62. These adjustments are necessary or desirable to suit the requirements of bottles of different diameters, whereby quart bottles and pint bottles or even two quart bottles may be handled by the same machine.

The object of having the bottles travel out of the machine while partly supported on conveyor 46 and partly on the floor bar 58, is to provide means for rotating the bottles while they are being delivered, whereby they may be inspected on all sides by an inspector stationed at one side of this feeder. The associated infeeding mechanism for each filler and capper is preferably driven therefrom, but separate driving motors, or driving connections, are preferably employed for each filling and capping machine, and therefore each may be operated independently of the other. The outfeeding mechanism is also preferably provided with an independently operating motor, or with separately operable driving connections, whereby it may be actuated while either of the fillers and cappers is in operation, or after both are shut down, and at full or half speed.

The driving connections for one of the filler and capper machines and its infeeder are shown in Figure 6 in which an electric motor 70 is illustrated with its shaft 71 connected to the cooperating star wheel 21 thru the sprocket chain 72, shaft 73, beveled gear wheels 74 and 75 and vertically disposed star wheel shaft 76. The driving mechanism provided between the shaft 71 and sprocket chain 72, comprsies a transmission adapted to give two speeds to the star wheel 21, conveyors 6 and 16, and feeding wheel 31. Upon the shaft 71 is mounted a pinion 71$^a$ adapted to rotate gear 71$^b$ secured to shaft 71$^c$. Upon the shaft 71$^c$ and rotatable therewith, is a pinion 71$^d$ adapted to rotate gear 71$^e$ secured to shaft 71$^f$. Rotatably mounted upon shaft 71$^f$ are two pinions 71$^g$ and 71$^h$ which are adapted to be engaged by clutch 87. When either of the pinions 71$^g$ and 71$^h$ is driven by the shaft 71$^f$ through the clutch 87, they will rotate their respective gears 71$^i$ and 71$^j$ secured to shaft 72$^a$. The rotation of the shaft 72$^a$ by either of the gears 71$^i$ and 71$^j$ will rotate sprocket wheel 72ᵇ to drive sprocket 72. Bevel gear 78 will be driven by the rotation of shaft 72ᵃ through bevel gears 77.

The infeeding conveyor 6 is driven from the motor shaft 71 thru the beveled gear wheels 78 and 79, shaft 80 and sprocket wheel 81.

The associated conveyor 16 is driven from shaft 80 thru the sprocket chain 83, and the rotary feeding wheel 31 is driven from the shaft 80 thru the beveled gear wheels 84 and 85 and the vertically disposed wheel supporting shaft 86, and the filling and capping mechanism is driven thru the clutch 87, the connections not being illustrated in detail.

The motor 88 (Figure 5) drives the outfeeding conveyor 46 thru the motor shaft 89 train of gear wheels and pinions 90, 91, 92 and 93 shaft 94, sprocket chain 95 and shaft 97 about which this conveyor travels at its rear end. The conveyor 46 drives its own supporting shaft 98 at its front or inner end, and this serves also as a driving shaft for the shorter outfeeding conveyor 45. The latter has a supporting shaft 99 at its rear end which is driven by it and drives the rotary outfeeding wheel 55 thru the beveled gear wheels 103 and 104 and the vertical shaft 105.

With driving mechanisms for the various parts operated independently as above described, it is obvious that either filler, or filler and capper, may operate separately or jointly with the other and in either case the outfeeder may operate to carry away the filled bottles and deposit them upon a receiving table 110 where they will be automatically divided by the apex of the guard walls 111 against which they are pushed by the succeeding bottles. The receiving crates will be placed on a table 114 and two operators, one at each side of the table 110 may remove the bottles from that table and place them in the crates. The use of a separate motor and driving connections for the outfeeder makes it possible to operate this mechanism at the required speed for handling bottles from two filler and capper mechanisms or only one.

By providing the overhead chute or guiding tracks 116 extending directly between the infeeding and outfeeding ends of and above the level of the bottle handling mechanism, each infeeding operator may place his crate upon the front end of this chute after delivering the empty bottles to table 2 and each crate will push the next rearwardly whereby the supply of empty crates at the rear or crate refilling end of the machine, will be kept equal to the number of crates of bottles emptied at the front end, after once filling the chute with empty crates. The chute may be nearly or quite horizontal but it is preferably somewhat inclined toward the rear end to facilitate pushing the crates rearwardly. A stop 118 prevents the crates from sliding off, or from being pushed off, at the rear end.

The guard 57′ of the outfeeder is flexible and adjustable in two directions by means of the bracket 112, which has plural bolt holes or sets of bolt holes 113. This adjustment, and also the adjustment of the guard 60 is made in correspondence with the diameter of the bottles to be fed and may therefore take place at the same time that levers 62 are adjusted. The guard 50 is adjustable inwardly or outwardly by a similar bracket 114, bracket 115 serving merely as a supporting shoulder. The levers 62 may be pivoted to the walls 57 at 117, whereby this wall may be adjusted simultaneously with the adjustment of the guard 60.

I claim:—

1. In a bottle handling machine, the combination with a bottle conveyor having a bottle passage contracted in one portion to allow but one bottle to pass at a time, and means for axially rotating the bottles as they approach said contracted portion to prevent a plurality of bottles from jamming and interfering with their movement in regular sequence through said passage.

2. In a bottle handling machine, the combination with a bottle conveyor having a bottle passage contracted in one portion to allow but one bottle to pass at a time, and means for axially rotating the bottles as they approach said contracted portion to prevent a plurality of bottles from jamming and interfering with their movement in regular sequence through said passage, the portion of the conveyor along which the bottles approach said contracted portion being of a sufficient width to allow the advance of bottles thereon along parallel lines, and said bottle rotating means being adapted to urge the bottles toward one of said lines of travel.

3. In a bottle handling machine, the combination with a bottle feedway having guides for bottles traveling along said way, and bottle rotating means co-operative with said guides to cause bottles traveling along parallel lines on said way, to move in sequence along a portion of one of said lines and to otherwise prevent passage of bottles along said portion of the way.

4. In a bottle handling machine, the combination with a bottle conveyor for moving upright bottles, spaced relatively adjustable guides for bottles carried thereby, and bottle rotating means co-operative with one of the guides to move bottles toward the other guide and allow delivery of but one bottle at a time.

5. The combination of a set of bottle conveyors having receiving end portions in juxtaposition and adapted to convey bottles in different directions, a feeding table extending along the receiving end portions of said conveyors and across which bottles may be pushed to the conveyors in miscellaneous order, a divider at the receiving ends of the conveyors and provided with bottle deflecting walls extending over said conveyors from an intermediate apex adjacent to said table, whereby bottles pushed across the table may be separated and directed to the respective conveyor convergent bottle guides adapted to concentrate the bottles on the conveyors toward a single line of travel and including a rotary friction wheel associated with each conveyor on one side of said line, and a cooperating guide on the other side, spaced from the wheel at a proper distance for allowing but one bottle at a time to pass through such space, whereby miscellaneously-grouped bottles may be aligned in single file on the delivery end portion of each conveyor.

6. The combination with a receiving table, of a set of conveyors along the rear side thereof arranged to run in different directions from a space in the rear of the central portion of the table, a deflector occupying said space and provided with an apex near the rear margin of the table, said deflector having divergent guide walls extending obliquely over the rear end portions of the respective conveyors and along the rear sides thereof, cooperative guides extending from said table obliquely over said conveyors from the front side thereof toward the guides at the rear side, rotary friction wheels each cooperating with one of the oblique guides and spaced to allow bottles to pass between them and such guide in single file to the delivery end portions of the respective conveyors.

7. The combination with a bottle conveyor, of guides arranged to form a bottle passage along said conveyor, wide in its initial portion and of a width in its delivery portion adapted to allow bottles to be conveyed only in single file, and a rotary wheel associated with the guides at one side of the passage, substantially at the junction of the initial with the delivery portions and adapted to facilitate the movement of the bottles into single file in the delivery portion without jamming.

8. In a bottle handling machine, the combination with an outfeeding conveyor having an initial portion adapted to receive bottles from different directions and in a confused relation to each other, a guide extending along one side of the conveyor, frictional means spaced from said guide at a distance sufficient to allow but one bottle to pass at any given time and adapted to move said bottles with a rolling motion about a vertical axis in the direction of said guide and of the conveyor movement, whereby the bottles may be actuated without being subjected to crushing pressure upon each other.

9. In a bottle handling machine, the combination with an outfeeding conveyor having an initial portion adapted to receive bottles from different directions and in a confused relation to each other, a guide extending along one side of the conveyor, frictional means spaced from said guide at a distance sufficient to allow but one bottle to pass at any given time and adapted to move said bottles with a rolling motion about a vertical axis in the direction of said guide and of the conveyor movement, whereby the bottles may be actuated without being subjected to crushing pressure upon each other, said frictional means comprising a rotary wheel having a circular periphery, and means for actuating the wheel in a direction to cause its bottle contacting portions to move in the general direction of conveyor movement.

10. In a bottle handling machine, an outfeeding conveyor having a receiving portion of sufficient width to receive bottles in a confused relation of lateral and lineal adjustment with reference to each other, an adjustable guide extending along one side of the delivery portion of the conveyor, a cooperating adjustable guide extending obliquely over the conveyor in the direction of the first mentioned guide, a rotary wheel having a circular periphery against which the bottles are directed by said converging guide, means for actuating said wheel in a direction to cause the advancing bottles to move with rolling motion along the first mentioned guide, and a third guide substantially parallel with the first mentioned guide and so spaced therefrom as to allow the bottles to be conveyed through said space only in lineal relation to each other, said third guide extending from the delivery side of said rotary wheel toward the delivery end of the conveyor.

11. In a bottle handling machine, the combination of an outfeeding conveyor having a receiving portion adapted to receive and convey bottles in various positions of lateral and lineal arrangement with reference to each other and a delivery portion adapted to receive and convey the bottles in single file, of means for feeding the bottles from the receiving portion to the delivery portion including a guide extending along one side of the conveyor, and means for applying frictional pressure to the bottles from the opposite side in a direction to cause them to rotatively approach the guide wall while moving along the line of conveyor travel.

12. In a bottle handling machine, the combination of an outfeeding conveyor having a receiving portion adapted to receive and convey bottles in various positions of lateral and lineal arrangement with reference to each other and a delivery portion adapted to receive and convey the bottles in single file, of means for feeding the bottles from the receiving portion to the delivery portion including a guide extending along one side of the conveyor, and means for applying frictional pressure to the bottles from the opposite side in a direction to cause them to rotatively approach the guide wall while moving along the line of conveyor travel, said frictional bottle rotating means being spaced from the guide at a distance permitting the passage of only one bottle at any given time.

GUSTAV STRANDT.